(12) United States Patent
Lee et al.

(10) Patent No.: US 10,459,420 B2
(45) Date of Patent: Oct. 29, 2019

(54) METHOD FOR SETTING FEED RATE OF ROTATING CUTTING TOOL IN REAL TIME AND CONTROL DEVICE

(71) Applicant: DOOSAN MACHINE TOOLS CO., LTD., Chang-won-si, Gyeongsangnam-do (KR)

(72) Inventors: Kang Jae Lee, Yongin-si (KR); Jin Suk Song, Yongin-si (KR)

(73) Assignee: DOOSAN MACHINE TOOLS CO., LTD., Chang-won-si, Gyeongsangnam-do (KR)

( * ) Notice: Subject to any disclaimer, the term of this patent is extended or adjusted under 35 U.S.C. 154(b) by 472 days.

(21) Appl. No.: 14/962,829

(22) Filed: Dec. 8, 2015

(65) Prior Publication Data
US 2016/0161936 A1 Jun. 9, 2016

Related U.S. Application Data

(63) Continuation of application No. PCT/KR2014/004545, filed on May 21, 2014.

(30) Foreign Application Priority Data

Jun. 10, 2013 (KR) .................. 10-2013-0065806

(51) Int. Cl.
*G05B 19/18* (2006.01)
*B23Q 15/013* (2006.01)
*B23Q 15/08* (2006.01)

(52) U.S. Cl.
CPC .......... *G05B 19/182* (2013.01); *B23Q 15/013* (2013.01); *B23Q 15/08* (2013.01); *G05B 2219/43156* (2013.01)

(58) Field of Classification Search
CPC ........ G05B 19/182; G05B 2219/43156; G05B 19/404; G05B 2219/42344; B23Q 15/08;
(Continued)

(56) References Cited

U.S. PATENT DOCUMENTS

2004/0179915 A1* 9/2004 Hill ................... B23Q 17/0971
409/131
2009/0069927 A1* 3/2009 Suzuki ............... B23Q 11/0039
700/177
(Continued)

FOREIGN PATENT DOCUMENTS

KR 100300238 B1 10/2001
KR 100497660 B1 7/2005
(Continued)

OTHER PUBLICATIONS

English Machine Translation of WO2013/073436.*
International Search Report for application No. PCT/KR2014/004545 dated Sep. 12, 2014.

*Primary Examiner* — Dzung Tran
(74) *Attorney, Agent, or Firm* — Hauptman Ham, LLP

(57) ABSTRACT

Disclosed are a method for setting a feed rate of a rotating cutting tool in real time and a device for controlling a feed rate of a rotating cutting tool in real time. The method includes: a vibration data collecting operation (S20) of collecting vibration information from a sensor installed in a machine tool (100); a chatter vibration trend diagram deducing operation (S30) of deducing a chatter vibration trend diagram (G) by simplifying an increase and a decrease of chatter vibration based on the collected vibration data; a chatter vibration trend determining operation (S40) of determining whether an inclination of the chatter vibration trend diagram (G) is increased or decreased; and tool feed rate adjusting operations (S51 and S52) of adjusting a feed rate
(Continued)

of the tool to be decreased when the inclination of the chatter vibration trend diagram (G) is increased.

9 Claims, 13 Drawing Sheets

(58) Field of Classification Search
CPC ............... B23Q 15/013; B23Q 15/007; Y10T 409/306832
USPC .................................... 700/173; 409/79, 106
See application file for complete search history.

(56) References Cited

U.S. PATENT DOCUMENTS

| | | | |
|---|---|---|---|
| 2009/0110499 A1* | 4/2009 | Inagaki | B23Q 17/0976 408/143 |
| 2010/0104388 A1* | 4/2010 | Suzuki | B23Q 11/0039 409/131 |
| 2011/0135415 A1* | 6/2011 | Hamaguchi | B23Q 11/0032 409/79 |
| 2012/0093603 A1 | 4/2012 | Ueno | |

FOREIGN PATENT DOCUMENTS

| KR | 20100083473 A | 7/2010 |
|---|---|---|
| KR | 101134940 B1 | 4/2012 |

\* cited by examiner

Fig. 11

| PROCESS | PROTRUDING STRUCTURE CUTTING PROCESS | |
|---|---|---|
| WORKPIECE | SM45C(HARDNESS: 20~30 HRC) | |
| TOOL CHARACTERISTIC | FLAT END MILL | HES2100 XLT (TOOL MANUFACTURING COMPANY MODEL NO) |
| | DIAMETER(D) | 10mm |
| | PROTRUDING LENGTH(L-e) | 55mm |
| | TOOL LENGTH(L) | 100mm |
| | BLADE LENGTH(l) | 45mm |
| MANUAL PROCESS CONDITION (INFLUENCE OF TOOL LENGTH IS IGNORED) | RADIAL CUT QUANTITY(R) | 2mm |
| | AXIAL DEPTH(A) | 15mm |
| | TOOL FEED RATE(f) | 300 mm/min |
| | SPEED(rpm) | 2900 rev/min |
| | MATERIAL REMOVAL RATE(MRR) | 9000 mm$^3$/min |
| RECOMMENDED PROCESS CONDITION (INFLUENCE OF TOOL LENGTH IS REFLECTED) | RADIAL CUT QUANTITY(R) | 2mm |
| | AXIAL DEPTH(A) | 3mm |
| | TOOL FEED RATE(f) | 300 mm/min |
| | SPEED(rpm) | 2900 rev/min |
| | MATERIAL REMOVAL RATE(MRR) | 1800 mm$^3$/min |
| RECOMMENDED PROCESS CONDITION IN EXEMPLARY EMBODIMENT (INFLUENCE OF TOOL LENGTH IS REFLECTED) (TOOL FEED RATE IS IMPROVED) | RADIAL CUT QUANTITY(R) | 2mm |
| | AXIAL DEPTH(A) | 3mm |
| | TOOL FEED RATE(f) | 600 mm/min |
| | SPEED(rpm) | 4313 rev/min |
| | MATERIAL REMOVAL RATE(MRR) | 3600 mm$^3$/min |

Fig. 12

| PROCESS | PROTRUDING STRUCTURE CUTTING PROCESS | |
|---|---|---|
| WORKPIECE | Aluminum(AL: -7076) | |
| TOOL CHARACTERISTIC | FLAT END MILL | AES2100 XLT (TOOL MANUFACTURING COMPANY MODEL NO) |
| | DIAMETER(D) | 10mm |
| | PROTRUDING LENGTH(L-e) | 55mm |
| | TOOL LENGTH(L) | 100mm |
| | BLADE LENGTH(l) | 50mm |
| MANUAL PROCESS CONDITION (INFLUENCE OF TOOL LENGTH IS IGNORED) | RADIAL CUT QUANTITY(R) | 3mm |
| | AXIAL DEPTH(A) | 15mm |
| | TOOL FEED RATE(f) | 2016 mm/min |
| | SPEED(rpm) | 8000 rev/min |
| | MATERIAL REMOVAL RATE(MRR) | 90720 mm$^3$/min |
| RECOMMENDED PROCESS CONDITION (INFLUENCE OF TOOL LENGTH IS REFLECTED) | RADIAL CUT QUANTITY(R) | 2.5mm |
| | AXIAL DEPTH(A) | 10mm |
| | TOOL FEED RATE(f) | 2016 mm/min |
| | SPEED(rpm) | 8000 rev/min |
| | MATERIAL REMOVAL RATE(MRR) | 50400 mm$^3$/min |
| RECOMMENDED PROCESS CONDITION IN EXEMPLARY EMBODIMENT (INFLUENCE OF TOOL LENGTH IS REFLECTED) (TOOL FEED RATE IS IMPROVED) | RADIAL CUT QUANTITY(R) | 2.5mm |
| | AXIAL DEPTH(A) | 10mm |
| | TOOL FEED RATE(f) | 3268 mm/min |
| | SPEED(rpm) | 10400 rev/min |
| | MATERIAL REMOVAL RATE(MRR) | 90700 mm$^3$/min |

Fig.13

| PROCESS | POCKET CUTTING PROCESS | |
|---|---|---|
| WORKPIECE | SM45C(HARDNESS: 20~30 HRC) | |
| TOOL CHARACTERISTIC | FLAT END MILL | R217.69-2525.0-12-2A) (MANUFACTURING COMPANY MODEL NO) |
| | DIAMETER(D) | 25mm |
| | PROTRUDING LENGTH(L-e) | 87mm |
| | TOOL LENGTH(L) | |
| | BLADE LENGTH(l) | 15mm |
| MANUAL PROCESS CONDITION (INFLUENCE OF TOOL LENGTH IS IGNORED) | RADIAL CUT QUANTITY(R) | 25mm |
| | AXIAL DEPTH(A) | 2mm |
| | TOOL FEED RATE(f) | 500 mm/min |
| | SPEED(rpm) | 2802 rev/min |
| | MATERIAL REMOVAL RATE(MRR) | 25000 mm$^3$/min |
| RECOMMENDED PROCESS CONDITION (INFLUENCE OF TOOL LENGTH IS REFLECTED) | RADIAL CUT QUANTITY(R) | 25mm |
| | AXIAL DEPTH(A) | 1.6mm |
| | TOOL FEED RATE(f) | 500 mm/min |
| | SPEED(rpm) | 4203 rev/min |
| | MATERIAL REMOVAL RATE(MRR) | 20000 mm$^3$/min |
| RECOMMENDED PROCESS CONDITION IN EXEMPLARY EMBODIMENT (INFLUENCE OF TOOL LENGTH IS REFLECTED) (TOOL FEED RATE IS IMPROVED) | RADIAL CUT QUANTITY(R) | 25mm |
| | AXIAL DEPTH(A) | 1.6mm |
| | TOOL FEED RATE(f) | 620 mm/min |
| | SPEED(rpm) | 6746 rev/min |
| | MATERIAL REMOVAL RATE(MRR) | 24800 mm$^3$/min |

Fig. 14

| PROCESS | CORNER CUTTING PROCESS | |
|---|---|---|
| WORKPIECE | SM45C(HARDNESS: 20~30 HRC) | |
| TOOL CHARACTERISTIC | FACE MILL | HES2180 XLT (MANUFACTURING COMPANY MODEL NO) |
| | DIAMETER(D) | 8mm |
| | PROTRUDING LENGTH(L-e) | 40mm |
| | TOOL LENGTH(L) | 90mm |
| | BLADE LENGTH(l) | 35mm |
| MANUAL PROCESS CONDITION (INFLUENCE OF TOOL LENGTH IS IGNORED) | RADIAL CUT QUANTITY(R) | 1.6mm |
| | AXIAL DEPTH(A) | 12mm |
| | TOOL FEED RATE(f) | 330 mm/min |
| | SPEED(rpm) | 380 rev/min |
| | MATERIAL REMOVAL RATE(MRR) | 6336 mm$^3$/min |
| RECOMMENDED PROCESS CONDITION (INFLUENCE OF TOOL LENGTH IS REFLECTED) | RADIAL CUT QUANTITY(R) | 1.5mm |
| | AXIAL DEPTH(A) | 4mm |
| | TOOL FEED RATE(f) | 330 mm/min |
| | SPEED(rpm) | 3800 rev/min |
| | MATERIAL REMOVAL RATE(MRR) | 1980 mm$^3$/min |
| RECOMMENDED PROCESS CONDITION IN EXEMPLARY EMBODIMENT (INFLUENCE OF TOOL LENGTH IS REFLECTED) (TOOL FEED RATE IS IMPROVED) | RADIAL CUT QUANTITY(R) | 1.5mm |
| | AXIAL DEPTH(A) | 4mm |
| | TOOL FEED RATE(f) | 660 mm/min |
| | SPEED(rpm) | 5373 rev/min |
| | MATERIAL REMOVAL RATE(MRR) | 3960 mm$^3$/min |

METHOD FOR SETTING FEED RATE OF ROTATING CUTTING TOOL IN REAL TIME AND CONTROL DEVICE

TECHNICAL FIELD

The present disclosure relates to a method for setting a feed rate of a rotating cutting tool in real time and a device for controlling a feed rate of a rotating cutting tool in real time, which are capable of varying a feed rate of a tool when a cutting process is performed on a workpiece by using a rotating cutting tool.

BACKGROUND ART

In general, a movement path of a tool, a speed of the tool, and the like in a machine tool are numerically controlled, so that a cutting process is performed on a workpiece. Examples of the machine tool include a machining center, a turning center, and an NC milling machine. The machine tool is also referred to as a numerical control complex processing machine.

Among the tools, there is a rotation cutting tool which rotates in a state of being mounted in a spindle and performs a cutting process on a stopped workpiece. Examples of the rotation cutting tool include an end mill, a face mill, a milling tool, a drill tool, and a boring tool. Hereinafter, the "rotation cutting tool" is abbreviated and called the "tool".

The machine tool is evaluated to have excellent productivity when a material removal rate (MRR) is high, and when surface roughness of a processed surface is low, the machine tool is evaluated to have an excellent processing quality.

The MRR is determined according to a cutting condition element, such as a cutting depth in a radius direction, a cutting depth in an axis direction, a speed of a main shaft, and a feed rate of a main shaft. Here, the speed of the main shaft and the speed of the spindle have the same meaning. Further, when the spindle is rotated in a state where the tool is mounted on the spindle, the tool is rotated, so that it may be understood that the speed of the tool and the speed of the main shaft have the same numerical value. Further, it may be understood that a feed rate of the main shaft and a feed rate of the tool have the same value. The MRR may be expressed by Equation 1 below.

$$MRR = R \times A \times V \quad \text{[Equation 1]}$$

MRR: Material removal rate (mm³/min)
R: Cutting depth in radius direction (mm)
A: Cutting depth in axis direction (mm)
V: Feed rate of main shaft (mm/min)

That is, according to Equation 1, even any one among the cutting condition elements is increased, the MRR is increased. In the meantime, there is a case where a cutting condition of a tool is represented by a tool manufacturing company as a manual recommendation condition. However, the manual recommendation condition is provided based on a maximally allowed static processing load, and is a value, to which a chatter vibration characteristic generated during the cutting process is not reflected.

Accordingly, there is a problem in that it is impossible to handle chatter vibrations generated during the cutting process and damage of a tool or a workpiece according to a dynamic processing load amplified by the chatter vibration. Because of this, an operator tends to perform the cutting process by setting a cutting condition to a very stable cutting condition instead of the manual recommended condition.

Further, the process condition includes the type of tool, a tool shape, a protruding length of a tool, the number of blades of a tool, hardness of a workpiece, a position (a position of X, Y, and Z coordinates) of a processing point within a machine tool, and the chatter vibration has a characteristic continuously changed according to the process condition.

That is, in order to secure a process quality, an operator tends to apply a very conservative cutting condition among the manual recommended conditions represented by a tool manufacturing company, thereby causing a problem of degrading productivity.

In order to improve both productivity and a process quality, it is demanded to suppress and avoid vibrations by continuously evaluating and analyzing a vibration characteristic during a progress of a cutting process.

DISCLOSURE

Technical Problem

An object of the present disclosure is to provide a method for setting a feed rate of a rotating cutting tool in real time and a device for controlling a feed rate of a rotating cutting tool in real time, which improve productivity by increasing a feed speed of a tool during a progress of a cutting process, and suppress and avoid vibrations of the tool.

Technical Solution

In order to solve the technical problem, an exemplary embodiment of the present disclosure provides a method for setting a feed rate of a rotating cutting tool in real time, the method including: a vibration data collecting operation S20 of collecting vibration information from a sensor installed in a machine tool 100; a chatter vibration trend diagram deducing operation S30 of deducing a chatter vibration trend diagram G by simplifying an increase and a decrease of chatter vibration based on the collected vibration data; a chatter vibration trend determining operation S40 of determining whether an inclination of the chatter vibration trend diagram G is increased or decreased; and tool feed rate adjusting operations S51 and S52 of adjusting a feed rate of the tool is to be decreased when the inclination of the chatter vibration trend diagram G is increased.

In the tool feed rate adjusting operations S51 and S52, when the inclination of the chatter vibration trend diagram G is decreased, the feed rate of the tool may be adjusted to be increased.

In the tool feed rate adjusting operations S51 and G52, an increase and decrease adjustment range of the feed rate of the tool may be limited to a range of 2 to 10% from a current feed rate of the tool.

In order to solve the technical problem, another exemplary embodiment of the present disclosure provides a method for setting a feed rate of a rotating cutting tool in real time, the method including: a manual material removal rate inputting operation S60 of receiving a manual material removal rate MMS provided from a tool manufacturing company; a corrected material removal rate calculating operation S70 of virtually correcting a current feed rate of the tool and calculating a corrected material removal rate MMS-1 according to the correction; a corrected material removal rate application determining operation S80 of comparing a largeness and smallness relation between the manual material removal rate MMS and the corrected material removal rate MMS-1, and determining whether to apply the virtually set feed rate of the tool; and tool feed rate adjustment applying operations S91 and S92 of adjusting the feed rate of the tool to be increased when the corrected material removal rate MMS-1 is smaller than the manual material removal rate MMS.

In the tool feed rate adjustment applying operations S91 and S92, when the corrected material removal rate MMS-1 is larger than the manual material removal rate MMS, the feed rate of the tool may be adjusted to be decreased.

In the corrected material removal rate calculating operation S70, an increase and decrease adjustment range of the feed rate of the tool may be limited to a range of 2 to 10% from a current feed rate of the tool.

In the adjustment material removal rate application determining operation S80, a largeness and smallness relation between a value of 90% of the manual material removal rate MMS and the corrected material removal rate MMS-1 may be compared.

In order to solve the technical problem, yet another exemplary embodiment of the present disclosure provides a method for setting a feed rate of a rotating cutting tool in real time, the method including: a manual material removal rate inputting operation S60 of receiving a manual material removal rate MMS provided from a tool manufacturing company; a vibration data collecting operation S20 of collecting vibration information from a sensor installed in a machine tool 100; a chatter vibration trend diagram deducing operation S30 of deducing a chatter vibration trend diagram G by simplifying an increase and a decrease of chatter vibration based on the collected vibration data; a chatter vibration trend determining operation S40 of determining whether an inclination of the chatter vibration trend diagram G is increased or decreased; a corrected material removal rate calculating operation S70 of correcting a current feed rate of the tool to be virtually increased when the inclination of the chatter vibration trend diagram G is decreased, and calculating a corrected material removal rate MMS-1 according to the correction; a corrected material removal rate application determining operation S80 of comparing a largeness and smallness relation between the manual material removal rate MMS and the corrected material removal rate MMS-1, and determining whether to apply the virtually set feed rate of the tool; and tool feed rate adjustment applying operations S91 and S92 of adjusting the feed rate of the tool to be increased when the corrected material removal rate MMS-1 is smaller than the manual material removal rate MMS, and adjusting the feed rate of the tool to be decreased when the corrected material removal rate MMS-1 is larger than the manual material removal rate MMS.

In the corrected material removal rate calculating operation S70, when the inclination of the chatter vibration trend diagram G is increased, the current feed rate of the tool may be corrected to be virtually decreased.

In order to solve the technical problem, still another exemplary embodiment of the present disclosure provides a device for controlling a feed rate of a rotating cutting tool in real time, in which a feed rate of the tool is set by the method for setting the feed rate of the rotating cutting tool in real time, so that a machine tool is controlled so that the feed rate of the tool is adjusted.

Advantageous Effects

As described above, the method for setting the feed rate of the rotating cutting tool in real time and the device for controlling the feed rate of the rotating cutting tool in real time according to the exemplary embodiment of the present disclosure may improve productivity by increasing a feed rate of a tool while performing a cutting process.

Further, in the method for setting the feed rate of the rotating cutting tool in real time and the device for controlling the feed rate of the rotating cutting tool in real time according to the exemplary embodiment of the present disclosure, chatter vibration is monitored when a feed rate of a tool is adjusted to be increased and the cutting process is performed, and when a sign representing an increase of the chatter vibration is shown, the feed rate of the tool is decreased or is returned to a feed rate of the tool in a previous operation, thereby maintaining a good process quality.

Further, the method for setting the feed rate of the rotating cutting tool in real time and the device for controlling the feed rate of the rotating cutting tool in real time do not change a predetermined tool path, and thus do not apply a large change to the cutting process, thereby preventing the amount of operation of an operator from being increased.

Further, the method for setting the feed rate of the rotating cutting tool in real time and the device for controlling the feed rate of the rotating cutting tool in real time may ultimately prevent a lifespan of the tool from being abnormally decreased by decreasing and avoiding vibration during the cutting process, protect a workpiece, and improve productivity by decreasing a processing time.

DESCRIPTION OF DRAWINGS

FIGS. 11 to 14 are tables for describing an example, in which a feed rate is changed by the method for setting a feed rate of a rotating cutting tool in real time according to the exemplary embodiment of the present disclosure.

DESCRIPTION OF MAIN REFERENCE NUMERALS OF DRAWINGS

Figure 1:
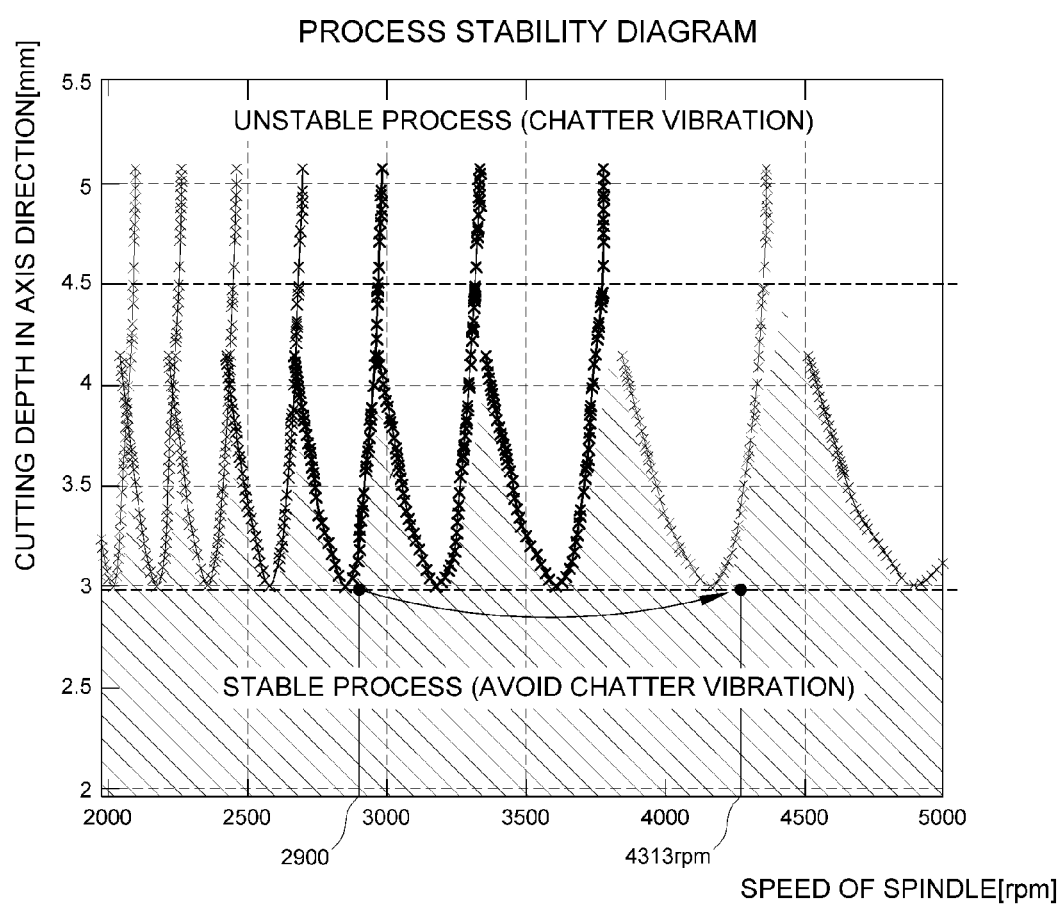
FIG. 1 is a process stability diagram illustrating an example, in which a speed of a spindle of a rotating cutting tool is changed in order to increase a material removal rate (MRR).

100: Machine tool
200: Vibration processing unit
300: Terminal
400: Terminal display image
410: Data input/output
420, 430: Vibration amplitude outputting unit
G: Chatter vibration trend diagram
G1: Chatter vibration increase diagram G2: Chatter vibration decrease diagram
G3: Chatter vibration standstill diagram

BEST MODE

Advantages and characteristics of the present disclosure, and a method of achieving the advantages and characteristics will be clear with reference to an exemplary embodiment to be described in detail together with the accompanying drawings.

Hereinafter, an exemplary embodiment of the present disclosure will be described in detail with reference to the accompanying drawings. It should be appreciated that the exemplary embodiment, which will be described below, is illustratively described for helping the understanding of the present disclosure, and the present disclosure may be variously modified to be carried out differently from the exemplary embodiment described herein. In the following description of the present disclosure, a detailed description and a detailed illustration of publicly known functions or constituent elements incorporated herein will be omitted when it is determined that the detailed description may unnecessarily make the subject matter of the present disclosure unclear. Further, the accompanying drawings are not illustrated according to an actual scale, but sizes of some constituent elements may be exaggerated to help understand the present disclosure.

Further, the terms used in the description are defined considering the functions of the present disclosure and may vary depending on the intention or usual practice of a manufacturer. Therefore, the definitions should be made based on the entire contents of the present specification.

Like reference numerals indicate like elements throughout the specification.

Figure 2:
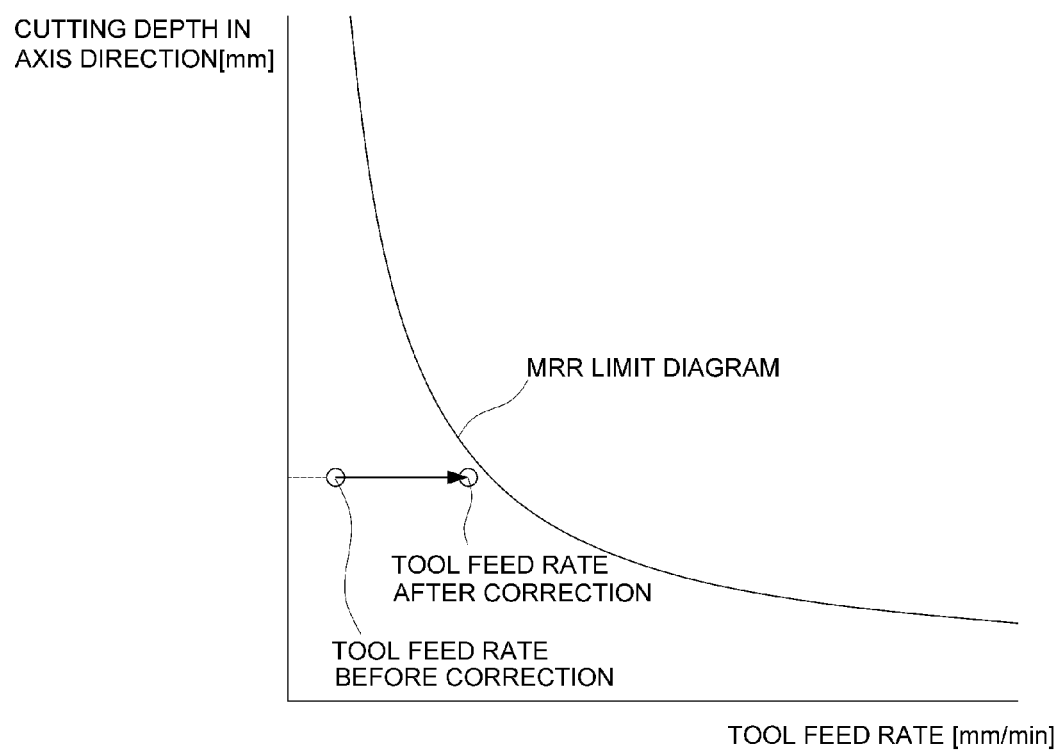
FIG. 2 is a diagram for describing an MRR limit diagram.

First, a method for improving productivity will be first described with reference to FIGS. 1 and 2. FIG. 1 is a process stability diagram illustrating an example, in which a speed of a spindle of a rotating cutting tool is changed in order to increase a material removal rate (MRR). FIG. 2 is a diagram for describing an MRR limit diagram.

In a state where a cutting process is stable while performing the cutting process, a vibration size is small, and when a trend of a size of chatter vibration is observed, the trend of the size of chatter vibration is uniform or decreased. By contrast, when the cutting process is unstable, it is shown that a vibration size is increased, and a trend of a size of chatter vibration is increased.

Meanwhile, when an MRR is high, the rotating machine tool is evaluated to have excellent productivity. The MRR is determined according to a cutting condition elements, such as a cutting depth in a radius direction, a cutting depth in an axis direction, a speed of a main shaft, and a feed rate of a main shaft.

When even any one among the aforementioned cutting condition element is increased, the MRR is increased. However, when the cutting process is started, it is difficult to correct a cutting depth in an axis direction. Accordingly, as illustrated in FIG. 1, there is a method for increasing a speed of a spindle (a speed of a main shaft), but the method has a limit in improving productivity.

Accordingly, in the present disclosure, as illustrated in FIG. 2, productivity is improved by increasing a feed rate of a tool.

A tool manufacturing company represents a material removal rate of a corresponding tool as a manual recommended condition. Accordingly, the present disclosure aims to improve productivity and maintain a good process quality by correcting a feed rate of a tool within an MRR limit diagram.

Figure 3:
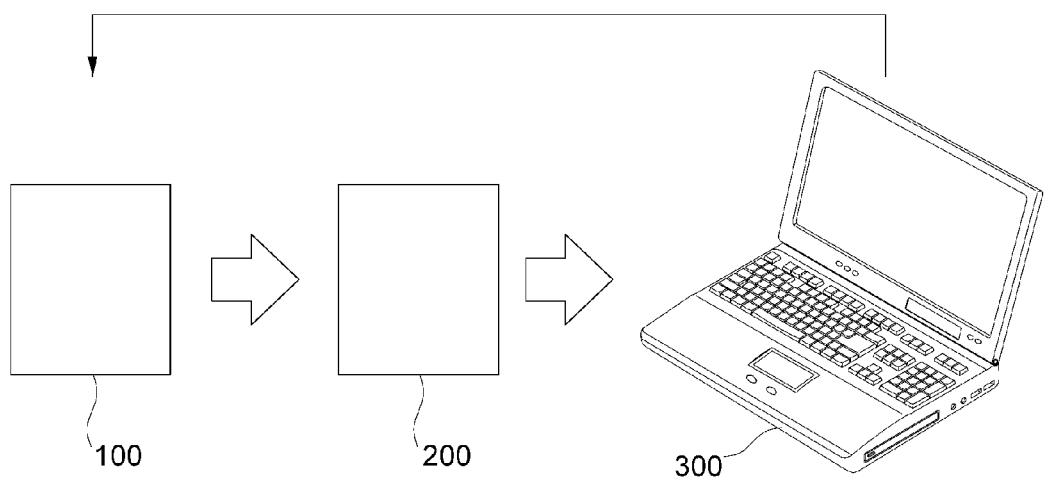
FIGS. 3 and 4 are example diagrams for describing operations of a method for setting a feed rate of a rotating cutting tool in real time and a device for controlling a feed rate of a rotating cutting tool in real time according to an exemplary embodiment of the present disclosure.
Figure 4:
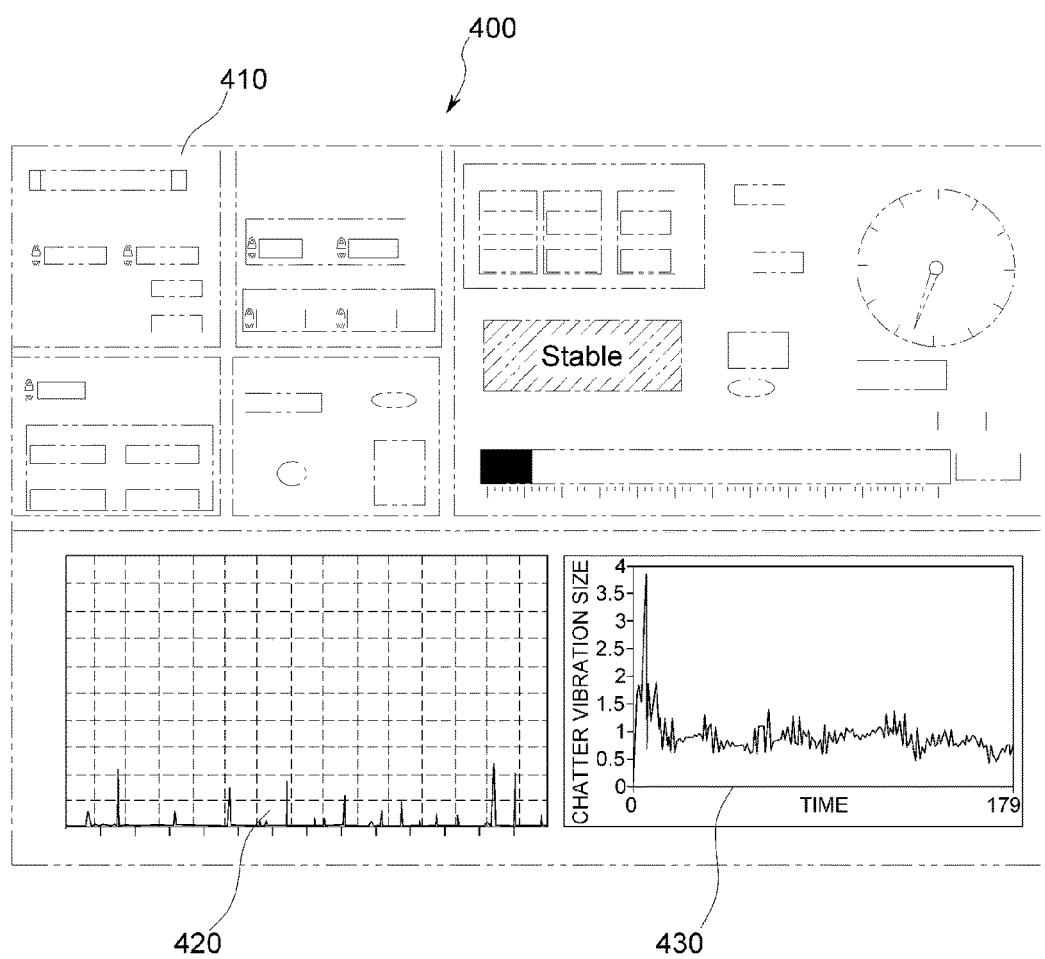

Hereinafter, a method for setting a feed rate of a rotating cutting tool in real time and a device for controlling a feed rate of a rotating cutting tool in real time according to the present disclosure will be described with reference to FIGS. 3 and 4. FIGS. 3 and 4 are example diagrams for describing operations of a method for setting a feed rate of a rotating cutting tool in real time and a device for controlling a feed rate of a rotating cutting tool in real time according to an exemplary embodiment of the present disclosure.

As illustrated in FIG. 3, a machine tool 100 collects information, and a vibration processing unit 200 calculates the collected information, and a user may recognize information on vibration that is the calculation result through a terminal 300.

A sensor sensing vibration of a main shaft is provided in the machine tool 100, and vibration information is generated by the sensor and is transmitted to the vibration processing unit 200. The vibration processing unit 200 analyzes various received vibration information, and processes the currently generated vibration into a specific form, and transmits the processed form to the terminal 300. A terminal display image 400 is displayed on the terminal 300, and the user may recognize whether vibration is generated and a current chatter vibration condition through the terminal display image 400.

The sensor provided in the machine tool 100 may be an accelerometer, an acoustic sensor, and the like, and measures hardness in an X-axis and a Y-axis of the machine tool and generates information on a vibration mode.

The vibration processing unit 200 may be mounted in the machine tool, and on the other hand, may also be disposed in a remote control room. When the vibration processing unit 200 is disposed in the remote control room, it is possible to remotely control the machine tool 100.

The terminal 300 serves as an input/output device of a computer, and recognizes a vibration condition, and handles the vibration and adjusts a speed of the tool, a feed rate of the tool, and the like. The terminal 300 may be provided in various forms, such as a notebook computer, a tablet PC, and a smart phone, and a computer disposed in a remote control room may also perform an operation of the terminal 300.

The terminal display image 400 is displayed on the terminal 300. A data input/output unit 410, through which various data values are input and managed, is provided in the terminal display image 400. Further, vibration amplitude outputting units 420 and 430, which output a vibration size and a vibration width, are provided in the terminal display image 400.

The method for setting the feed rate of the rotating cutting tool in real time according to the exemplary embodiment of the present disclosure may be loaded in the vibration processing unit 200 or the terminal 300. In any case, a vibration size and chatter vibration are monitored while a feed rate of the tool is increased, and when an abnormal chatter vibration sign is caught, a recommended tool feed rate appropriate to the current situation is recommended. The recommended tool feed rate is fed back to the machine tool 100. The machine tool 100 may automatically apply the recommended speed of the tool or induce an operator to apply the recommended speed of the tool.

Figure 5:
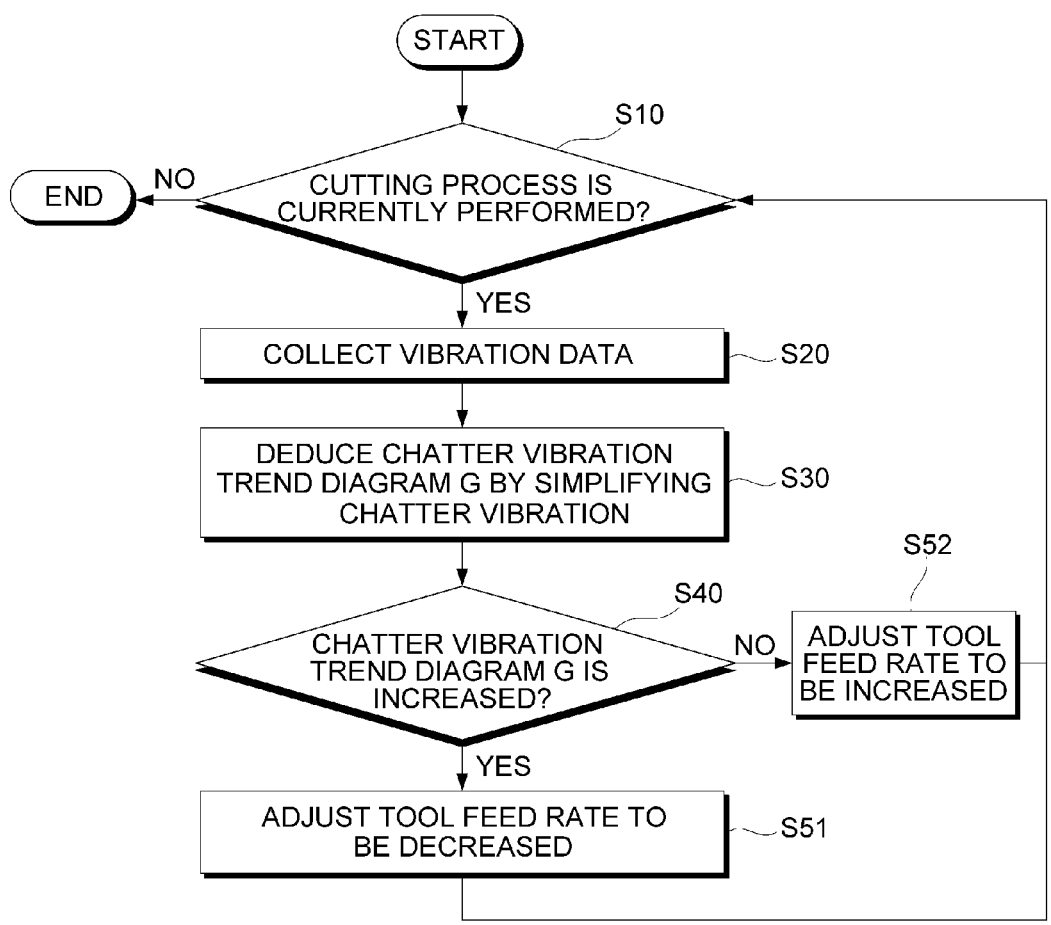
FIGS. 5 and 6 are flowcharts for describing the method for setting a feed rate of a rotating cutting tool in real time according to the exemplary embodiment of the present disclosure.
Figure 6:
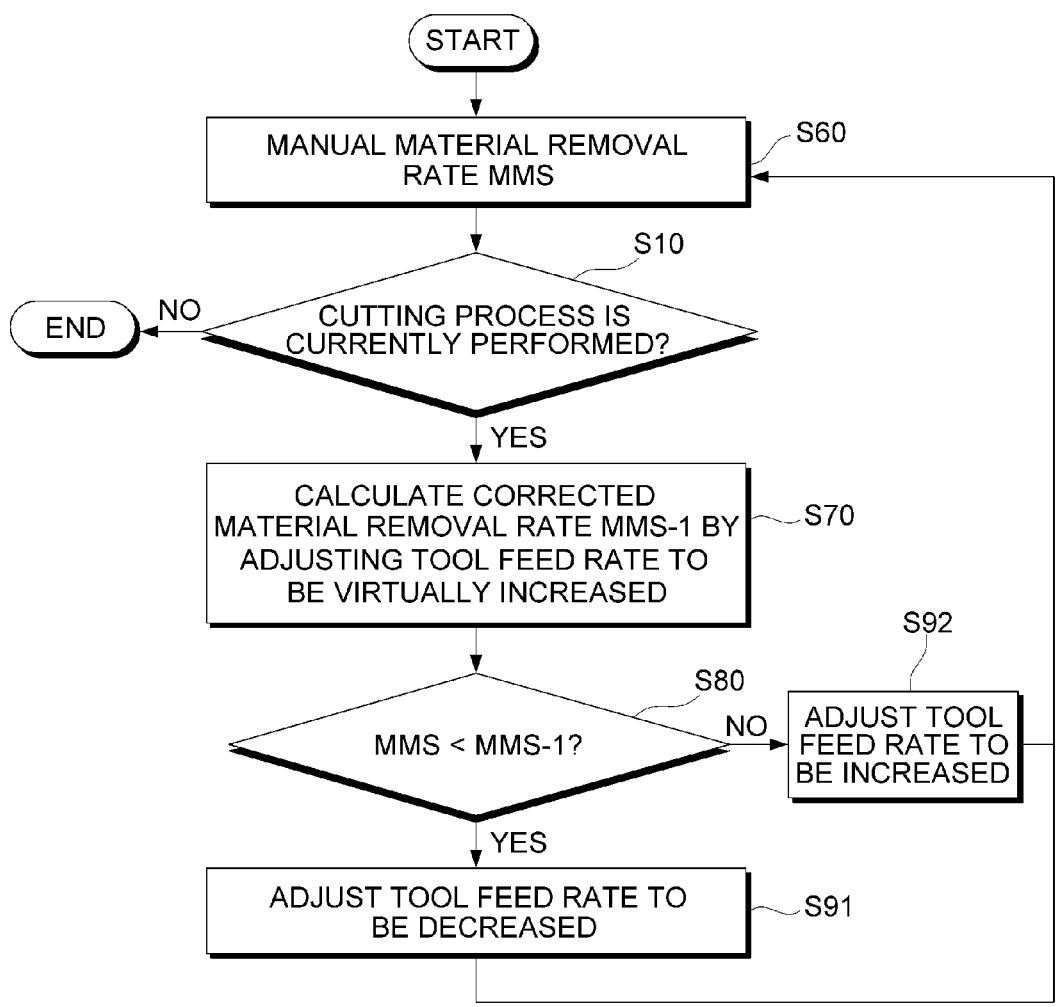

Hereinafter, the method for setting the feed rate of the rotating cutting tool in real time according to the exemplary embodiment of the present disclosure will be described with reference to FIGS. 5 and 6. FIGS. 5 and 6 are flowcharts for describing the method for setting the feed rate of the rotating cutting tool in real time according to the exemplary embodiment of the present disclosure.

First, a method of increasing a feed rate of the tool will be described based on each operation with reference to FIG. 5.

A cutting process determining operation S10: A cutting process determining operation S10 is an operation of determining whether the machine tool 100 performs a cutting process. When the machine tool 100 does not perform the cutting process, the method is terminated, and when the machine tool 100 performs the cutting process, the method proceeds to a next operation.

A vibration data collecting operation S20: A vibration data collecting operation (S20) is an operation of collecting vibration data from various sensors installed in the machine tool 100. The vibration data includes vibration information, such as a vibration size and a vibration width.

A chatter vibration trend diagram deducing operation S30: A chatter vibration trend diagram deducing operation S30 is an operation of displaying a vibration size over time as chatter vibration by processing the collected vibration data, deducing a chatter vibration trend diagram G by simplifying the chatter vibration, and displaying the deduced chatter vibration trend diagram G on the terminal 300.

A chatter vibration trend determining operation S40: A chatter vibration trend determining operation S40 is an operation of determining whether an inclination of the chatter vibration trend diagram G is increased, decreased, or in a standstill state according to a time flow.

Tool feed rate adjusting operations S51 and S52: In tool feed rate adjusting operations S51 and S52, when an inclination of the chatter vibration trend diagram G is increased, a feed rate of the tool is adjusted to be decreased (S51). By contrast, when an inclination of the chatter vibration trend diagram G is decreased, a feed rate of the tool is adjusted to be increased (S52).

In the meantime, when it is determined that an inclination of the chatter vibration trend diagram G is slightly changed and is in a standstill state even if an elapse of time occurs, a feed rate of the tool may not be adjusted or may be adjusted to be decreased.

An adjustment range of the increase and decrease of the feed rate of the tool may be limited to a range of 2 to 10% from the current feed rate of the tool. When the feed rate of the tool to be adjusted is too excessively increased, there is a concern that process stability is rather degraded, so that the feed rate of the tool may be increased in stages. In the meantime, when the feed rate of the tool to be adjusted is increased within a very small range, a lot of time may be needed until an effect of the improvement of productivity is expected. Accordingly, the adjustment range of the increase and decrease of the feed rate of the tool may be limited to a range of 2 to 10% from the current feed rate of the tool.

After the feed rate of the tool is adjusted, the method returns to the cutting process determining operation S10 or the vibration data collecting operation S20, and thus, continuously, whether to further adjust the feed rate of the tool is repeatedly determined and the feed rate of the tool is repeatedly adjusted.

Hereinafter, a method of limiting a corrected material removal rate to a manual material removal rate or less according to a feed rate of the tool will be described based on each operation with reference to FIG. 6.

A manual material removal rate inputting operation S60: A manual material removal rate inputting operation S60 is an operation of receiving a manual material removal rate. The manual material removal rate MMS is a value recommended by the tool manufacturing company, and may be understood as a range, in which the corresponding tool may stably implement the cutting process.

A cutting process determining operation S10: A cutting process determining operation S10 is an operation of determining whether the machine tool 100 performs a cutting process. When the machine tool 100 does not perform the cutting process, the method is terminated, and when the machine tool 100 performs the cutting process, the method proceeds to a next operation.

A corrected material removal rate calculating operation S70: A corrected material removal rate calculating operation S70 is an operation of virtually correcting a feed rate of the tool, and calculating a corrected material removal rate MMS-1 in this case. That is, the corrected material removal rate is adjusted so as not to exceed the manual material removal rate MMS by the correction of the feed rate of the tool.

The adjustment range of the increase and decrease of the virtual feed rate of the tool may be limited to a range of 2 to 10% from the current feed rate of the tool. When the feed rate of the tool to be adjusted is too excessively increased, there is a concern that process stability is rather degraded, so that the feed rate of the tool may be increased in stages. In the meantime, when the feed rate of the tool to be adjusted is increased within a very small range, a lot of time may be needed until an effect of the improvement of productivity is expected. Accordingly, the adjustment range of the increase and decrease of the virtual feed rate of the tool may be limited to a range of 2 to 10% from the current feed rate of the tool.

In the meantime, in the corrected material removal rate calculating operation S70, the corrected material removal rate MMS-1 when the feed rate of the tool corrected in the aforementioned tool feed rate adjusting operations S51 and S52 is applied may also be calculated.

A corrected material removal rate application determining operation S80: A corrected material removal rate application determining operation S80 is an operation of comparing a largeness and smallness relation between the manual material removal rate MMS and the corrected material removal rate MMS-1 and determining whether to apply the virtually set feed rate of the tool.

In the meantime, it may be limited to compare a largeness and smallness relation of a value of 70% to 90% of the manual material removal rate MMS and the corrected material removal rate MMS-1. That is, it is possible to secure stability of the cutting process by setting a more conservative value as a comparison target, and further maintain a good process quality.

Tool feed rate adjustment applying operations S91 and S92: In tool feed rate adjustment applying operations S91 and S92, when the corrected material removal rate MMS-1 is larger than the manual material removal rate MMS in the corrected material removal rate application determining operation S80, there is a concern that stability of the cutting process is unstable, so that the feed rate of the tool is adjusted to be decreased (S91). On the other hand, when the corrected material removal rate MMS-1 is smaller than the manual material removal rate MMS in the corrected material removal rate application determining operation S80, even though the feed rate of the tool is increased, stability of the cutting process may be maintained, so that the feed rate of the tool is adjusted to be increased (S92).

Figure 7:
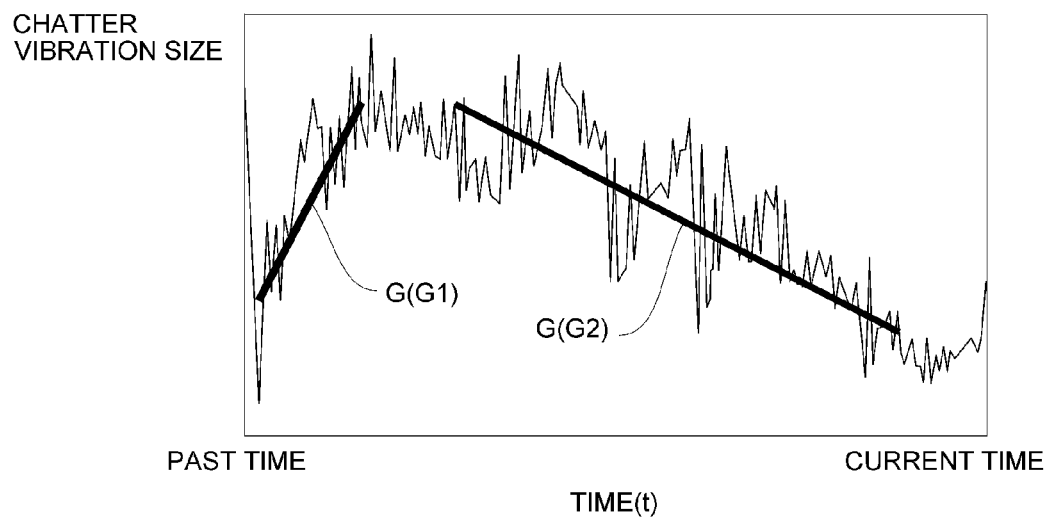
FIGS. 7 to 9 are diagrams for describing an example, in which a chatter vibration trend is monitored.
Figure 8:
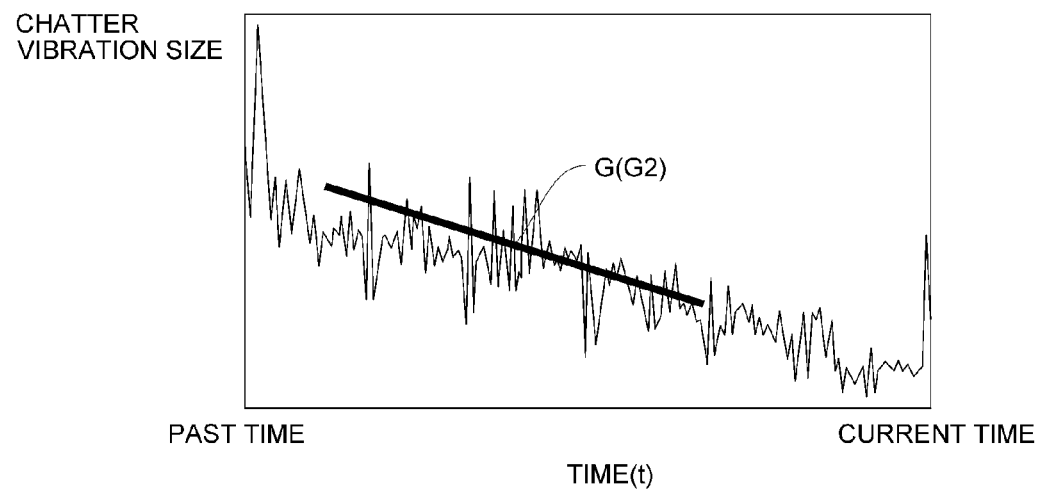
Figure 9:
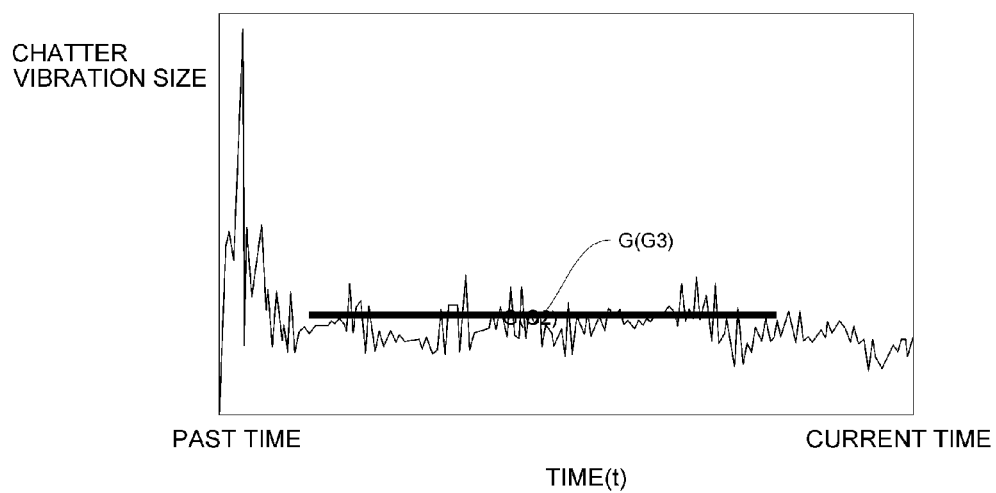

Hereinafter, a change in chatter vibration while performing the cutting process will be described with reference to FIGS. 7 to 9. FIGS. 7 to 9 are diagrams for describing an example, in which a chatter vibration trend is monitored.

When the cutting process is performed, the processing may be performed in a state where it is impossible to change a cutting depth in the axis direction, and a speed of the spindle is set to be maximally large within the range of the manual recommendation condition in order to maximize productivity. In this case, a size of chatter vibration is investigated while increasing the feed rate of the tool for the purpose of further improving productivity.

As illustrated in FIGS. 7 to 9, a size of chatter vibration is indicated as if being frequently increased and decreased, so that chatter vibration is evaluated by simplifying a chatter vibration size diagram to a chatter vibration trend diagram G.

The chatter vibration trend diagram G is represented as a chatter vibration increase diagram G1 when the chatter vibration is increased. Further, the chatter vibration trend diagram G is represented as a chatter vibration decrease diagram G2 when the chatter vibration is decreased. Further, the chatter vibration trend diagram G is represented as a chatter vibration standstill diagram G3 when the chatter vibration is similarly maintained.

Referring to the chatter vibration trend diagram G of FIG. 7, the chatter vibration increase diagram G1, in which the chatter vibration is increased, and the chatter vibration decrease diagram G2, in which the chatter vibration is decreased are represented. When the feed rate of the tool is increased and the chatter vibration increase diagram G1 is represented, the chatter vibration is monitored by decreasing the feed rate of the tool or returning the feed rate of the tool to the feed rate of the tool before the adjustment.

Referring to the chatter vibration trend diagram G of FIG. 8, the chatter vibration decrease diagram G2, in which the chatter vibration is decreased, is represented. That is, this means that the feed rate of the tool may be further increased, so that productivity is improved by further increasing the feed rate of the tool.

Referring to the chatter vibration trend diagram G of FIG. 9, the chatter vibration standstill diagram G3, in which a change in the chatter vibration is slight with respect to a time flow, is represented. That is, it is possible to further increase the feed rate of the tool, but cautions are required. That is, when the feed rate of the tool is further increased, there is a probability that the chatter vibration is increased, so that it is induced to maintain or decrease the current feed rate of the tool.

Figure 10:
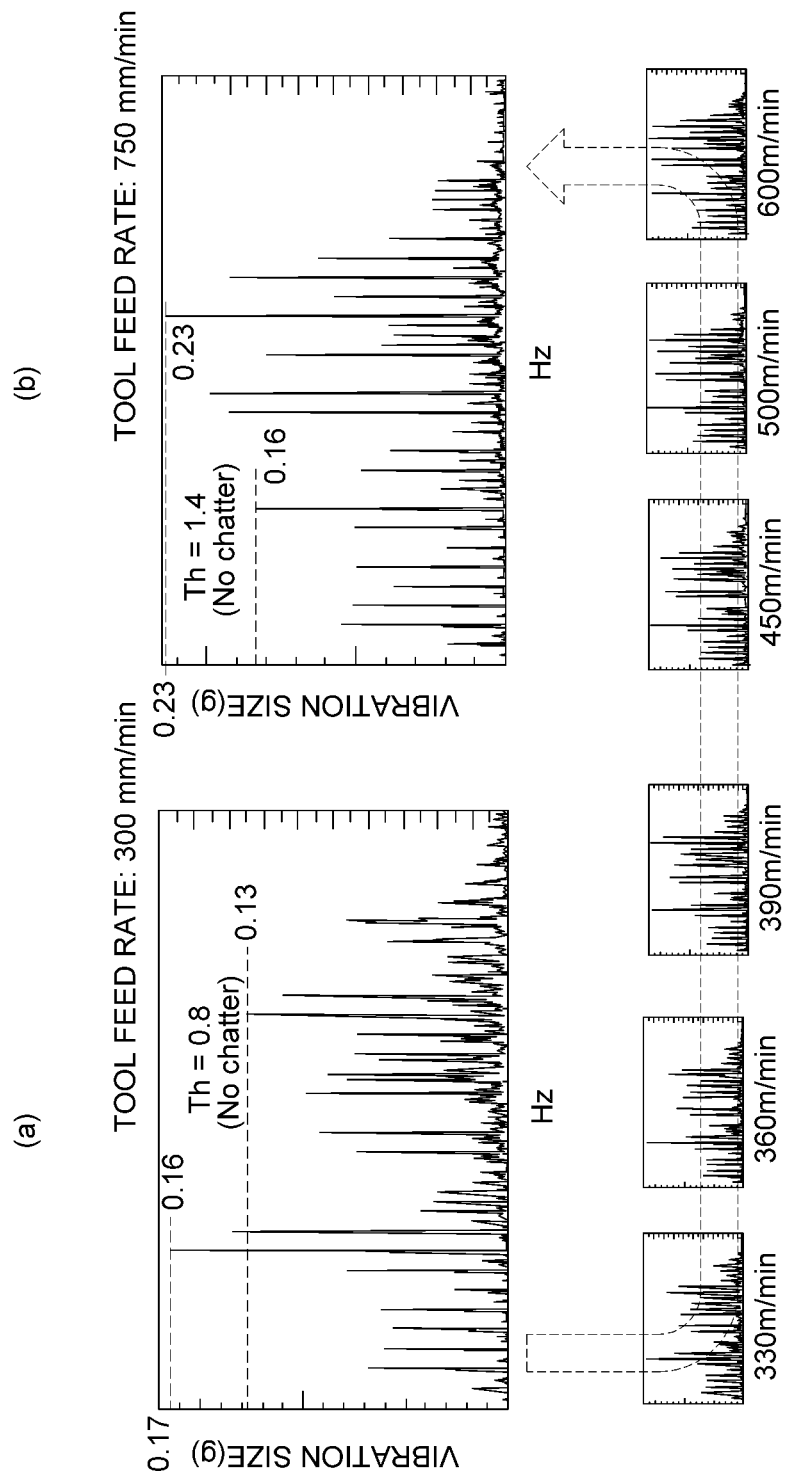
FIG. 10 is a diagram for describing exemplary states (a) and (b), in which a vibration size when a feed rate is changed by the method for setting a feed rate of a rotating cutting tool in real time according to the exemplary embodiment of the present disclosure is monitored.

Hereinafter, an example, in which the feed rate of the tool is increased, will be described with reference to FIG. 10. FIG. 10 is a diagram for describing exemplary states (a) and (b), in which a vibration size when the feed rate is changed by the method for setting the feed rate of the rotating cutting tool in real time according to the exemplary embodiment of the present disclosure is monitored.

State (a) of FIG. 10 illustrates a state before the feed rate of the tool is adjusted. In this case, the feed rate of the tool is 300 m/min, and a vibration size g is 0.13, which is a very small value, and represents a stable process state.

Then, the vibration size g is monitored while gradually increasing the feed rate of the tool to 330 m/min, 360 m/min, 390 m/min, 450 m/min, 500 m/min, and 600 m/min.

Subsequently, as illustrated in state (b) of FIG. 10, the feed rate of the tool is increased to 750 m/min Even in this case, the vibration size g is 0.16, and it may be recognized that the vibration size g of 0.16 represents the stable process state.

In the meantime, a corrected material removal rate MMS-1 after the rotation speed of the tool is adjusted while increasing the feed rate of the tool and a value of the manual material removal rate MMS represented by the tool manufacturing company are compared, and the corrected material removal rate MMS-1 is adjusted not to exceed the manual material removal rate MMS.

Hereinafter, an operation effect of the method for setting the feed rate of the rotating cutting tool in real time according to the exemplary embodiment of the present disclosure will be described with reference to FIGS. 11 to 14.

FIGS. 11 to 14 are tables for describing an example, in which the feed rate is changed by the method for setting the feed rate of the rotating cutting tool in real time according to the exemplary embodiment of the present disclosure.

When the exemplary embodiment illustrated in FIG. 11 is observed, in the manual process condition represented by the tool manufacturing company, the feed rate is 300 mm/min, and the material removal rate MRR is 9,000 mm$^3$/min, but the feed rate may be adjusted to 600 mm/min according to the exemplary embodiment of the present disclosure, and thus, a time taken for the cutting process may be considerably decreased. In the meantime, according to the exemplary embodiment of the present disclosure, the MRR is 3,600 mm$^3$/min, and it can be recognized that the material removal rate is within a range of the material removal rate of the manual processing condition. That is, in the exemplary embodiment of the present disclosure, it is possible to decrease a time taken for the cutting process and maintain a good process quality.

When the exemplary embodiment illustrated in FIG. 12 is observed, in the manual process condition represented by the tool manufacturing company, the feed rate is 2,016 mm/min, and the material removal rate MRR is 90,720 mm$^3$/min, but the feed rate may be adjusted to 3,628 mm/min according to the exemplary embodiment of the present disclosure, and the MRR may be implemented as 90,700 mm$^3$/min. Here, according to the exemplary embodiment of the present disclosure, it can be recognized that the material removal rate is within a range of the material removal rate of the manual processing condition. That is, in the exemplary embodiment of the present disclosure, it is possible to decrease a time taken for the cutting process and maintain a good process quality.

When the exemplary embodiment illustrated in FIG. 13 is observed, in the manual process condition represented by the tool manufacturing company, the feed rate is 500 mm/min, and the material removal rate MRR is 25,000 mm$^3$/min, but the feed rate may be adjusted to 620 mm/min according to the exemplary embodiment of the present disclosure, and the MRR may be implemented as 24,800 mm$^3$/min Here, according to the exemplary embodiment of the present disclosure, it can be recognized that the material removal rate is within a range of the material removal rate of the manual processing condition. That is, in the exemplary embodiment of the present disclosure, it is possible to decrease a time taken for the cutting process and maintain a good process quality.

When the exemplary embodiment illustrated in FIG. 14 is observed, in the manual process condition represented by the tool manufacturing company, the feed rate is 330 mm/min, and the material removal rate MRR is 6,336 mm$^3$/min, but the feed rate may be adjusted to 660 mm/min according to the exemplary embodiment of the present disclosure, and the MRR may be implemented as 3,960 mm$^3$/min Here, according to the exemplary embodiment of the present disclosure, it can be recognized that the material removal rate is within a range of the material removal rate of the manual processing condition. That is, in the exemplary embodiment of the present disclosure, it is possible to decrease a time taken for the cutting process and maintain a good process quality.

As described above, according to the method for setting the feed rate of the rotating cutting tool in real time and the device for controlling the feed rate of the rotating cutting tool in real time according to the exemplary embodiment of the present disclosure, it is possible to decrease a time taken for the cutting process and maintain a good process quality.

Accordingly, the method for setting the feed rate of the rotating cutting tool in real time and the device for controlling the feed rate of the rotating cutting tool in real time of the present disclosure may secure process stability by adjusting a speed of the tool while performing the cutting process.

Further, the method for setting the feed rate of the rotating cutting tool in real time and the device for controlling the feed rate of the rotating cutting tool in real time of the present disclosure do not change a predetermined tool path, and thus do not apply a large change to the cutting process, thereby preventing the amount of operation of the operator from being increased.

Further, the method for setting the feed rate of the rotating cutting tool in real time and the device for controlling the feed rate of the rotating cutting tool in real time according to the exemplary embodiment of the present disclosure may ultimately prevent a lifespan of the tool from being abnormally decreased by decreasing and avoiding the vibration of the cutting process, protect a workpiece, and improve productivity by decreasing a processing time.

The exemplary embodiments of the present disclosure have been described with reference to the accompanying drawings, but those skilled in the art will understand that the present disclosure may be implemented in another specific form without changing the technical spirit or an essential feature thereof.

Accordingly, it will be understood that the aforementioned exemplary embodiments are described for illustration in all aspects and are not limited, and it should be interpreted that the scope of the present disclosure shall be represented by the claims to be described below, and all of the changes or modified forms induced from the meaning and the scope of the claims, and an equivalent concept thereof are included in the scope of the present disclosure.

INDUSTRIAL APPLICABILITY

The method for setting the feed rate of the rotating cutting tool in real time and the device for controlling the feed rate of the rotating cutting tool in real time may be used for improving productivity by adjusting a feed rate of the tool when a cutting process is performed.

The invention claimed is:

1. A method for setting a feed rate of a rotating cutting tool in real time, the method comprising:
    sensing, by one or more sensors including electrical circuits and installed in a machine tool, vibration of a shaft mounted in the machine tool to collect vibration data by generating vibration information based on the sensed vibration of the shaft;
    deducing a chatter vibration trend diagram (G), wherein the chatter vibration diagram (G) is deduced by
        sensing a variation amplitude of the chatter vibration in size and width over a time frame based on the collected vibration data,
        determining whether an inclination of the chatter vibration is increased or decreased during the predetermined period of the time frame based on the sensed variation amplitude of the chatter vibration in size and width, and
        simplifying (i) the chatter vibration to be a first type diagram of the chatter vibration trend diagram (G) when the inclination of the chatter vibration is determined to be increased during the predetermined period of the time frame, and (ii) the chatter vibration to be a second type diagram of the chatter vibration trend diagram (G) when the inclination of the chatter vibration is determined to be decreased during the predetermined period of the time frame; and
    setting a feed rate of a rotating cutting tool in real time by controlling the rotating cutting tool to
        adjust the feed rate of the rotating cutting tool to be decreased when the chatter vibration trend diagram (G) is determined to be the first type diagram, or
        adjust the feed rate of the rotating cutting to be increased when the chatter vibration trend diagram (G) is determined to be the second type diagram.

2. The method of claim 1, wherein in the controlling the rotating cutting tool to adjust the feed rate of the rotating cutting tool, an increase and decrease adjustment range of the feed rate of the rotating cutting tool is limited to a range of 2 to 10% from a current feed rate of the rotating cutting tool.

3. A method performed by a device, implemented by a computer including electrical integrated circuits, for setting a feed rate of a rotating cutting tool in real time, the method comprising:
    receiving a manual material removal rate (MMS) provided from a tool manufacturing company;
    virtually correcting, in response to the received manual material removal rate (MMS), a current feed rate of the rotating cutting tool and calculating a corrected material removal rate (MMS-1) according to the correction;
    performing, implemented by the electrical integrated circuit, a signal processing for comparing a largeness and smallness relation between the manual material removal rate (MMS) and the corrected material removal rate (MMS-1), and determining whether to apply the virtually set feed rate of the rotating cutting tool; and
    setting, implemented by the electrical integrated circuit, the feed rate of the rotating cutting tool in real time by controlling the rotating cutting tool to adjust the feed rate of the rotating cutting tool to be increased when the corrected material removal rate (MMS-1) is determined to be smaller than the manual material removal rate (MMS).

4. The method of claim 3, wherein in the controlling the rotating cutting tool to adjust the feed rate of the rotating cutting tool, when the corrected material removal rate (MMS-1) is larger than the manual material removal rate (MMS), the feed rate of the rotating cutting tool is adjusted to be decreased.

5. The method of claim 3, wherein in the virtually correcting, in response to the received manual material removal rate (MMS), the current feed rate of the rotating cutting tool, an increase and decrease adjustment range of the feed rate of the rotating cutting tool is limited to a range of 2 to 10% from a current feed rate of the rotating cutting tool.

6. The method of claim 3, wherein in the comparing the largeness and smallness relation between the manual material removal rate (MMS) and the corrected material removal rate (MMS-1), a largeness and smallness relation between a value of 70% to 90% of the manual material removal rate (MMS) and the corrected material removal rate (MMS-1) are compared.

7. A method performed by a device for setting a feed rate of a rotating cutting tool in real time, the method comprising:
   receiving a manual material removal rate (MMS) provided from a tool manufacturing company;
   sensing, by one or more sensors including electrical circuits and installed in a machine tool, vibration of a shaft mounted in the machine tool to collect vibration data by generating vibration information based on the sensed vibration of the shaft;
   deducing a chatter vibration trend diagram (G), wherein the chatter vibration diagram (G) is deduced by
      sensing a variation amplitude of the chatter vibration in size and width over a time frame based on the collected vibration data,
      determining whether an inclination of the chatter vibration is increased or decreased during the predetermined period of the time frame based on the sensed variation amplitude of the chatter vibration in size and width, and
      simplifying (i) the chatter vibration to be a first type diagram of the chatter vibration trend diagram (G) when the inclination of the chatter vibration is determined to be increased during the predetermined period of the time frame, and (ii) the chatter vibration to be a second type diagram of the chatter vibration trend diagram (G) when the inclination of the chatter vibration is determined to be decreased during the predetermined period of the time frame;
   correcting, in response to the received manual material removal rate (MMS), a current feed rate of the rotating cutting tool to be virtually increased when the chatter vibration trend diagram (G) is determined to be the second type diagram, and calculating a corrected material removal rate (MMS-1) according to the correction;
   performing a signal processing for comparing a largeness and smallness relation between the manual material removal rate (MMS) and the corrected material removal rate (MMS-1), and determining whether to apply the virtually set feed rate of the rotating cutting tool; and
   controlling the rotating cutting tool to
      adjust the feed rate of the rotating cutting tool to be increased when the corrected material removal rate (MMS-1) is smaller than the manual material removal rate (MMS), and
      adjust the feed rate of the rotating cutting tool to be decreased when the corrected material removal rate (MMS-1) is larger than the manual material removal rate (MMS).

8. The method of claim 7, wherein in the comparing the largeness and smallness relation between the manual material removal rate (MMS) and the corrected material removal rate (MMS-1) when the inclination of the chatter vibration trend diagram (G) is increased, the current feed rate of the rotating cutting tool is corrected to be virtually decreased.

9. A device for controlling a feed rate of a rotating cutting tool in real time, in which a feed rate of the tool is set by the method for setting the feed rate of the rotating cutting tool in real time of claim 1, so that a machine tool is controlled so that the feed rate of the tool is adjusted.

* * * * *